Jan. 22, 1924.

R. E. HELLMUND 1,481,319

INDUCTION MOTOR CONTROL

Filed March 8, 1919        4 Sheets-Sheet 1

Fig.1

WITNESSES:

INVENTOR
Rudolf E. Hellmund
BY
ATTORNEY

Jan. 22, 1924.

R. E. HELLMUND 1,481,319

INDUCTION MOTOR CONTROL

Filed March 8, 1919    4 Sheets—Sheet 2

Fig. 2.

WITNESSES:
J. P. Wurmb.
A. O. Brand

INVENTOR
Rudolf E. Hellmund.
BY
Wesley G. Carr
ATTORNEY

Jan. 22, 1924.

R. E. HELLMUND 1,481,319

INDUCTION MOTOR CONTROL

Filed March 8, 1919    4 Sheets-Sheet 3

Fig. 3

WITNESSES:

INVENTOR
Rudolf E. Hellmund.
BY
ATTORNEY

Patented Jan. 22, 1924.

1,481,319

UNITED STATES PATENT OFFICE.

RUDOLF E. HELLMUND, OF SWISSVALE, PENNSYLVANIA, ASSIGNOR TO WESTING-HOUSE ELECTRIC AND MANUFACTURING COMPANY, A CORPORATION OF PENN-SYLVANIA.

INDUCTION-MOTOR CONTROL.

Application filed March 8, 1919. Serial No. 281,447.

*To all whom it may concern:*

Be it known that I, RUDOLF E. HELL-MUND, a citizen of the German Empire, and a resident of Swissvale, in the county of Allegheny and State of Pennsylvania, have invented a new and useful Improvement in Induction-Motor Controls, of which the following is a specification.

My invention relates to control systems for induction motors, having special relation to control systems of the character designated in which it is, at times, desired to operate a normally high-speed motor at exceptionally low speeds, and the primary object of my invention, therefore, is to so associate control apparatus with a motor of the character designated as to permit of motor operation, in industrial applications, at relatively low speeds and, at the same time, to preclude the possibility of dangerously high voltages and the development of excessive heat within the motor.

I contemplate such arrangement as will permit of relatively low operating speeds for industrial-motor applications by the use of a relatively small variable frequency changer adapted for connection to the primary member of the motor and, at the same time, to provide means whereby the normally high-speed operation of such motor may be carried on by means of an accelerating resistance. In this connection, I find it extremely desirable to inter-relate the control mechanisms of the two operations of the motor by various interlocking features in order that the motor may be shifted from one operating speed to the other operating speed in a simple and expeditious manner without imposing excessive strains upon the motor windings or other portions of the motor structure which may result from the change over between the two extreme limits of operation.

In order to avoid dangerous voltages in the main induction-motor secondary member when decelerating from normally high-speed operation to relatively low-speed operation and also in order to avoid dangerous magnetic pulls inside of the motor, as well as excessive magnetizing currents, I find that it is necessary to maintain the main-motor-field strength within certain well defined limits. On the other hand, I find that it is also desirable to maintain the field strength above certain limits in order to always have sufficient torque developed by the motor. In this connection, it will be observed that the speed of a regulating machine, such as a variable frequency changer, is not governed entirely by the resistance used to control the same but that the speed thereof is influenced, to a great degree, by the friction and windage conditions of such machine. It is quite difficult, therefore, to get the exact results and ratios necessary when operating in conjunction with a system of the above designated character by simply maintaining the same relative positions of the taps which control the voltage or by regulating manually the speed in such way as to control the frequency. However, I find that, if a relay is provided to control the switching operations necessary to connect the regulating machine to the secondary member of the main induction motor and thereafter maintain the correct relation, and if this device is influenced solely by a predetermined ratio of voltage to frequency, such influence being obtained, for instance, by the use of a purely inductive relay, the machines may be automatically connected only at such times as are dictated by the required ratio, and that this inter-connection may be performed wholly through the medium of the relay.

A particular application of my invention is to skip-hoists, cranes, and other similar apparatus in which it is desired that the normal speed shall be maintained throughout a large portion of the period of operation and then a heavy braking effect introduced, whereby the hoist or crane may lower any suspended object at a relatively low rate of speed. Such operation was formerly obtained by the use of direct-current excitation which was applied to the primary member of an induction motor during the time that the apparatus was operating at low or brake speed. When operating in this manner, however, it is substantially impossible to maintain the desired ratio of voltage to frequency, the necessity for which has just been pointed out, inasmuch as the direct current is of zero frequency and, therefore, is incapable of adjustment in such manner that the desired ratio may be obtained by control apparatus.

Again, if a frequency changer is used and has its commutator end connected to the secondary member of the induction motor which it is desired to operate at both a normally high speed and an exceptionally low speed, the transition in frequency from high-speed operation to low-speed operation will cause such gradation of frequencies to be impressed upon the secondary member that practically the entire range of frequencies, from the highest to the lowest, must be provided for in the design of the control and frequency changer. In order to obviate the provision for all frequencies, from the highest to the lowest, I find it of benefit to arrange a control system to so govern the operation of the motor that it is run at normal high frequency by connecting the source of energy directly to the primary member of the motor and, on the other hand, when it is desired to operate at an exceptionally low frequency, to connect the primary member of the motor, through a frequency changer, to the source of power.

I am not aware of any systems of control which have been used in the past in which this principle, namely, that of control through the primary member, is used and I believe, therefore, the method of operation which is hereinafter described in connection with a preferred form of my apparatus, to be entirely novel.

For a better understanding of my invention, reference may be had to the accompanying drawings, in which.

Figure 1:
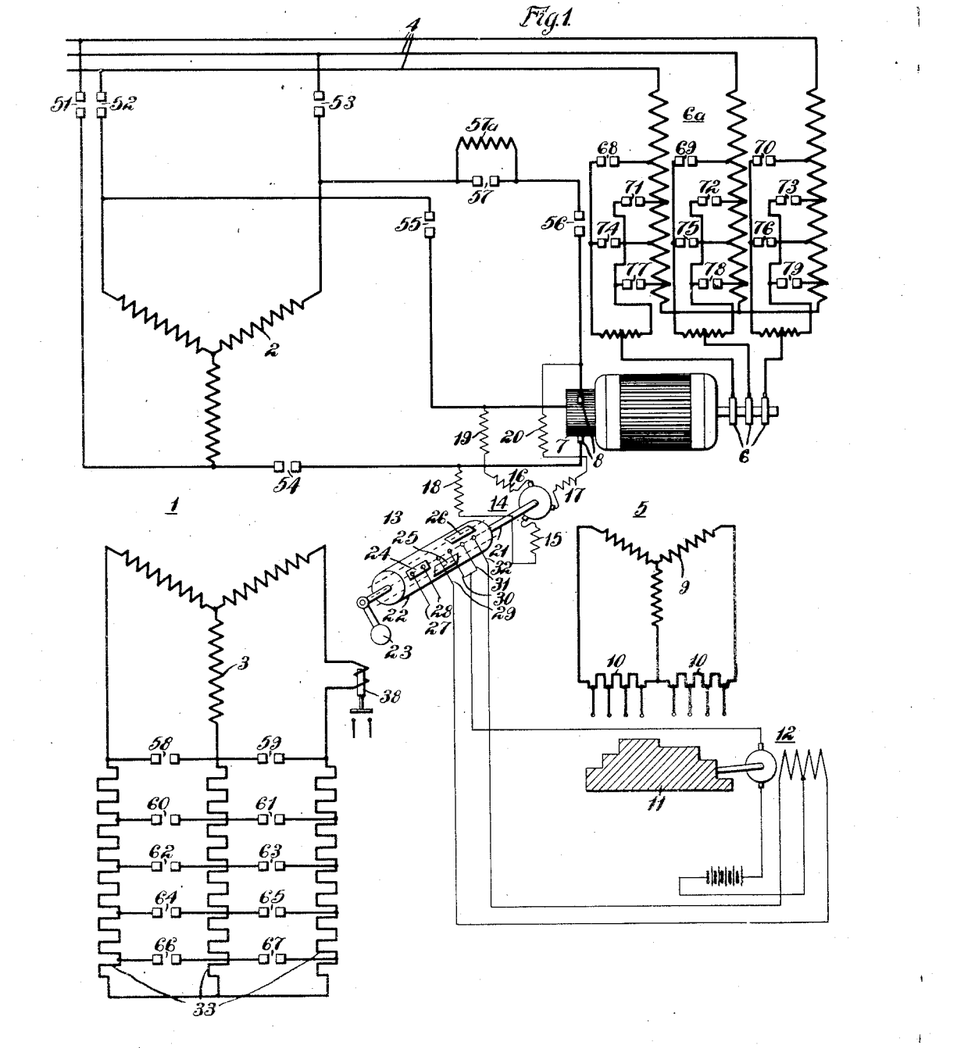
Fig. 1 is a diagrammatic view illustrating one embodiment of my invention, the system here shown making use of the aforementioned inductive relay.

Referring more especially to Fig. 1, an induction motor 1 of the polyphase type is shown as provided with a primary member 2 and a secondary member 3, the primary member 2 being shown as adapted to receive energy from any suitable source such, for example, as the polyphase mains 4 or from a regulating machine 5 of the frequency-changer type which is adapted to be supplied, through slip rings 6—6 and an auto transformer 6a, from the source of supply 4. Energy is derived from the machine 5 through the commutator 7 and the brushes 8—8. The frequency changer 5, which I have used, for purposes of convenience, in this description, is of the type shown in the U. S. Patent No. 1,235,583, issued to the Westinghouse Electric & Manufacturing Company, Aug. 7, 1917, on an application filed by F. W. Meyer. A wound-stator member 9 has resistance members 10—10 connected in series therewith, the absolute values of which may be varied by a segmental contact member 11, the member 11 being capable of the operation in the one or the other direction by a motor 12, adapted for operation in either direction by the provision of a split field winding, the two portions of which are energized, as will hereinafter be explained.

An inductive relay 13, comprising a motor relay element 14 and field-winding members 15, 16 and 17, is connected to the commutator 7 of the machine 5 through highly inductive elements 18, 19 and 20.

The principle of operation of the relay 13 may be set forth as follows. In a purely inductive device, such as the elements 18, 19 and 20, the flux created is directly proportional to the impressed voltage and inversely proportional to the frequency. The magnetizing current is proportional to such flux. The motor relay element 14 employs such magnetizing currents in accordance with the principles of operation of the polyphase series motor. The torque of the relay element is dependent upon these currents and the relay, therefore, operates to maintain the currents constant. This action causes the field flux to remain constant and, consequently, the desired ratio of voltage to frequency is maintained.

Carried on a shaft 21 of the motor relay 14, is a rotatable contact device 22 which is maintained in a predetermined position by a weight or other suitable restraining device 23. Conducting segments 24, 25 and 26 are mounted in predetermined positions upon the rotatable member 22 and are adapted to close circuits through terminals 27 and 28, 29 and 30, and 31 and 32, respectively. Adjustable resistors 33 are associated with the secondary member 3 of the main motor.

Figure 2:
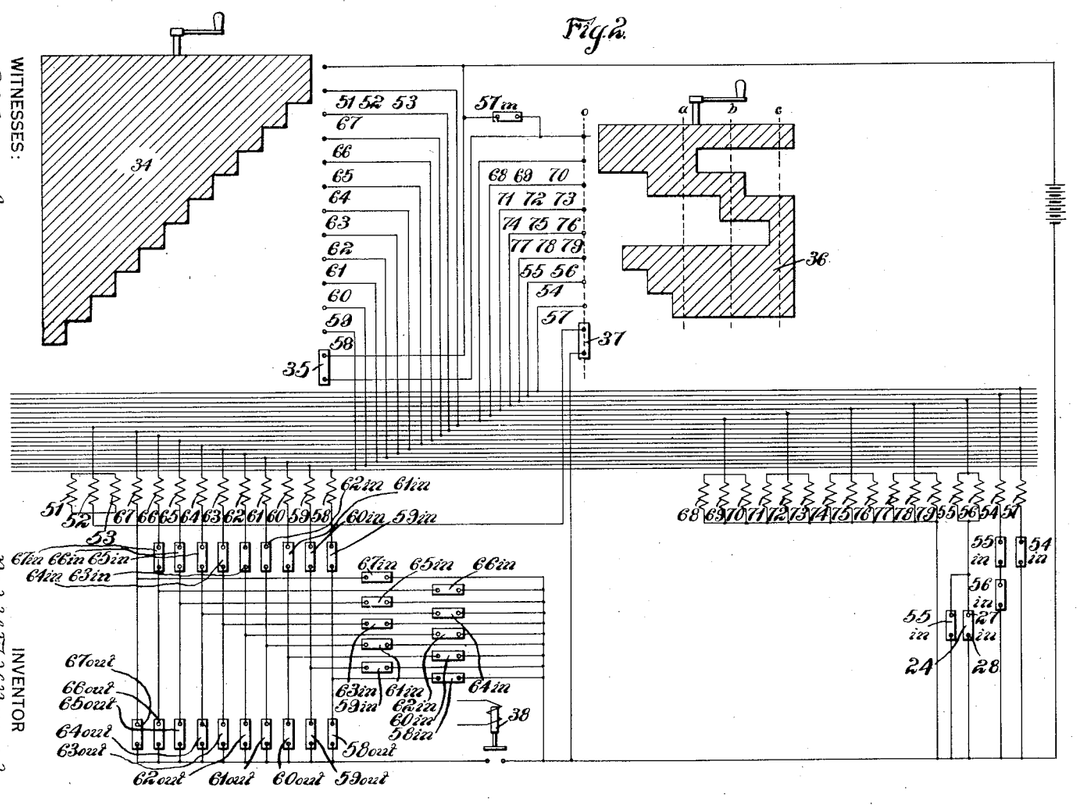
Fig. 2 is a diagrammatic view illustrating a development of a controller and the control circuits which are used to practice my invention, as illustrated in Fig. 1.

A controller 34, shown in Fig. 2, is adapted to vary the values of resistance elements 33, and an interlocking segment 35 is provided in connection with the controller 34 for purposes hereinafter described. A low-speed control segment 36, which is manipulated by an independent handle, is shown as having an interlocking segment 37 associated therewith. Furthermore, a current-limit switch 38 is associated with the secondary circuit 3 of the main motor.

Switches 51, 52 and 53 serve to connect the source of supply 4 with the primary member of the main induction motor. Switches 54, 55, 56 and 57 are used to connect the commutator 7 of the regulating machine 5 to the primary member 2, when desired.

The quantity of effective resistance inserted in the secondary circuit 3 of the main induction motor by the variable-resistance members 33 is adjusted by means of switches 58 to 67 inclusive, while the effective voltage impressed upon the frequency changer 5 is varied by manipulation of switches 68 to 79 inclusive, varying the secondary voltage of the auto transformer 6a, which has its primary member connected to the mains 4.

Having described one embodiment of my invention in a system of control, the operation thereof is as follows:

The motor is brought up to normally high speed by the movement of the control segment 34 to the right. In this connection, attention is directed to the circuit, including interlock segment 37, which is completed when the segment 34 is moved to the first position. The switches 51, 52 and 53 will then be energized and, upon closing, will connect the primary member 2 directly to the source of energy. In following through the first circuit completed, however, it will be observed that, unless the segment 36 is in its initial position and, therefore, the interlock segment 37 is at the point shown in Fig. 2, no circuit can be completed, and the machine cannot be started. This is a necessary precaution, and provides against the aforesaid connection when the low-speed controller is in any position other than its initial one.

The controller 34 is now moved one step more to the right, and a circuit is completed through the uppermost terminal, the energizing coil for the switch 67, and the interlock (67 out) and, if the limit switch 38 is in its lower position, through the battery and returning to the first-mentioned, or battery terminal. If the field conditions in the secondary member 3 of the motor 1 are not as desired, the limit switch 38 will not be closed, and circuit will not be completed, and, therefore, the switch 67 will not close, since its actuating coil is unenergized.

If, however, the correct conditions exist and a circuit is completed whereby the switch 67 is closed, it will be observed that a plurality of interlocks are provided whereby the maintenance of a number of desirable features is insured. Firstly, the interlock (67 in) admits of a circuit being maintained through the energizing coil of the switch 67, irrespective of the position which the limit switch 38 may assume after the said circuit has once been completed. Secondly, an additional interlock, which is closed when the switch 67 is in and which is designated in Fig. 2 as interlock (67 in); insures that an open circuit will exist for the succeeding switch 66 until the previous one has been closed. By this last system of interlocks, a gradual acceleration of the motor to its normally high speed is obtained.

If it is now desired to change over to low speed, control segment 34 is returned to its normal position, it being apparent that only in this position will the interlocking segment 35 be at such a point as to admit of the energization of the various switches which it is desired to control from the low-speed segment 36, and, moreover, it should be observed that the interlocking segment 37 precludes the operation of the main motor by voltage impressed thereupon directly from the source, unless the low-speed control segment 36 is in its initial or "off" position. Proceeding now to low-speed operation, the segment 36 is moved to its first position when the switches 68, 69 and 70 are closed, whereby the frequency changer 5 is connected to the source of energy through the transformer 6a, and the highest voltage is impressed thereupon, thus starting this regulating machine.

Movement of the segment 36 to the next position tends to establish a circuit through the energizing coils of the switches 55 and 56. However, unless the correct ratio of voltage to frequency exists, the hereinbefore described motor relay 13 will be in such position that the contact segment 24 will not bridge the terminals 27 and 28, and, if an open circuit thus exists, the switches 55 and 56 cannot be closed. When the desirable ratio, however, does not exist the motor 14 tends to turn the contact device 22 in such direction that the aforesaid terminals 27 and 28 will be bridged and the required circuit established whereby the switches 55 and 56 may be closed. Reference to Fig. 1 will indicate that the motor 12, by the rotation of which a drum segment 11 is adapted to change the amount of resistance in the frequency changer secondary 9, is moved in the one or the other direction in accordance with which of the contact segments 25 or 26 bridges its associated terminals.

Since it is a physical impossibility to prevent, in a system of this description, a temporary single-phase energization of the primary member 2 by reason of the fact that, of the three switches 54, 55 and 56, two of them will come in before the other one, temporary single-phase energization is purposely resorted to, and an appropriate high resistance 57a is inserted in the single-phase circuit which is completed. For a detailed description of the characteristics of such single-phase operation, reference may be had to the proceedings of The American Institute of Electrical Engineers for 1917, pages 335 to 337.

After the switches 55 and 56 have once been closed, an interlock (55 in) insures their being maintained in the closed position, irrespective of the movement of the contact segment 24 away from its associated terminals 27 and 28.

A further movement of the segment 36 to the left closes the switches 71, 72 and 73 and, at the same time, closes switch 54, the primary member of the machine 1 now being energized by three-phase power. Attention is directed to the interlocks (55 in) and (56 in) whereby the switch 54 is precluded from closing before the switches 55 and 56 have closed. It is now desirable to remove the resistance 56a, which was employed during the temporary single-phase excitation, from the circuit between the frequency changer and the main motor primary, and the next movement of the segment 36 to the left accomplishes this purpose by closing the switch 57.

The control segment 36 is now in its first operating or "a" position and the main motor is operating at the highest of its low frequencies. While segment 36 is in the "a" operating position the drum 34 is moved to the right in order to cut out, by successive steps, the resistance elements 33 in the secondary circuit of the main motor again under the control of the limit switch 38 as previously described in connection with the accelerator of the motor. By thus again utilizing the starting resistance 33, the speed of the motor is reduced gradually and without undue current peaks or mechanical stresses. In this connection, attention is directed to the interlock (57 in) which insures a continuous supply of energizing current to the switches which are operated by the control segment 36, even though the segment 35 moves away from its contacts because of the movement of the drum 34 to the right, in order to cut out the successive resistance steps in the secondary circuit of the main motor. After the segment 34 is in its last position, the drum 36 can be moved to its second operating or "b" position, whereby the switches 68, 69 and 70 are opened and the switches 74, 75 and 76 are closed, thus reducing the voltage impressed upon the frequency changer. The action of the relay 13 and the motor 12 which it controls, will cause the frequency of the frequency changer to automatically follow the voltage impressed thereupon because of the action of the required ratio of voltage to frequency upon the relay 13. It will thus be apparent that, with this form of my invention, the speed is regulated by manually changing the voltage only, the frequency being maintained automatically at the desired value through the agency of the motor relay. In certain cases, it may, however, be advisable to manually change the frequency and automatically maintain the voltage.

While the step from line frequency to that corresponding to position "a" on the segment 36 was relatively large, necessitating the use of the secondary resistance inserted by means of the drum 34, as previously described, the steps between the "a", "b" and "c" positions on the segment 36 are assumed to be so small that they may be taken without re-introducing the secondary resistance 33—33.

When it is desired to stop entirely, the drum 34 is moved to its initial position, then the segment 36 is returned to its initial position. Attention is directed to this sequence in stopping, since, if the operating handles were moved in a reverse sequence, the speed would increase during the stopping operation, instead of being gradually lowered to zero, as desired.

Figure 3:
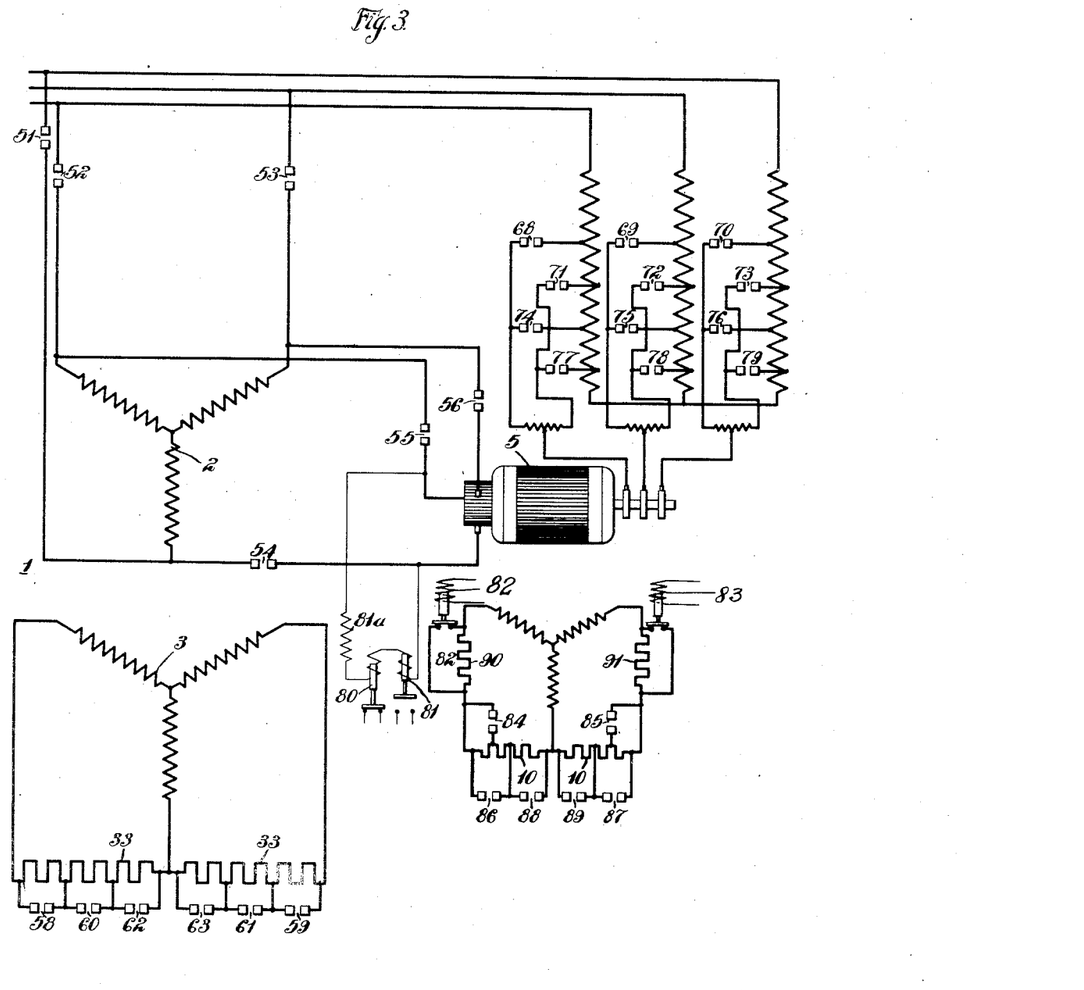
Fig. 3 is a diagrammatic view of a modification of the system disclosed in Fig. 1
Figure 4:
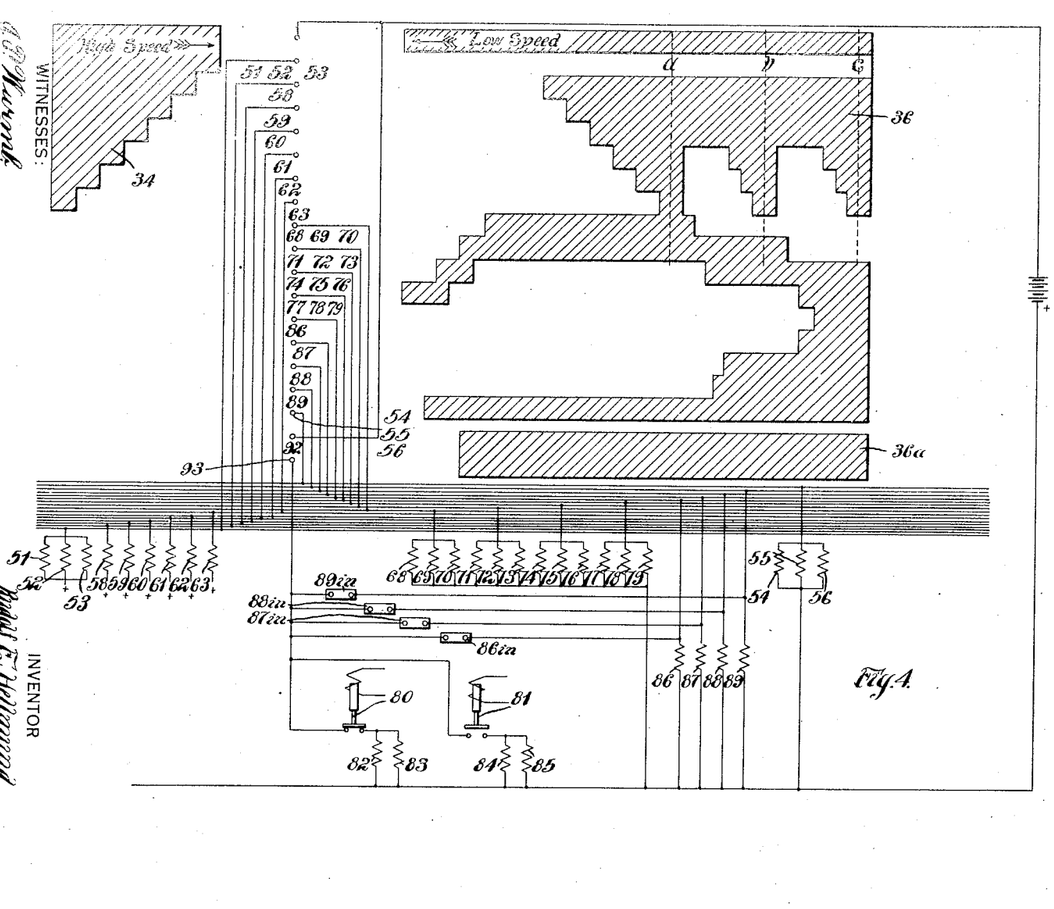
Fig. 4 is a diagrammatic view illustrating a development of the controller and the control circuits which are used to practice the invention illustrated in Fig. 3, in which only one handle is employed for the manipulation of the machine, under both extremes of operation.

Referring now to Fig. 3, a modification of the system shown in Fig. 1 as illustrated, in which the means for insuring the existance of the correct ratio of voltage to frequency prior to, and during, the connection of the frequency changer to the induction-motor primary is somewhat simplified and comprises high and low-limit switches, shown at 80 and 81, the positions shown being those existing under normal operating conditions or in which the ratio is correct. If the ratio is too high, the switch 80 is pulled upwardly, and if too low, the switch 81 drops and bridges its associated terminals. The relay circuit is again made highly inductive, if necessary, by adding an inductance coil 81a. A more detailed description of the operation of the switches 80 and 81 will be given hereinafter when the operation of the system shown in Fig. 3 is discussed.

All of the other switches used are analogous to those shown in Fig. 1, and their function is substantially the same, with the exception of switches 82 to 85 inclusive, the operation of which is governed by the limit relays 80 and 81, and the manually operated switches 86 to 89 inclusive, which are for purposes hereinafter to be described. The limit switches 80 and 81, in Fig. 3, perform the same function as do the relay 13 and its associated contacts in Fig. 1. In the modification shown in Fig. 3, both the frequency and the voltage of the frequency changer are governed by the control drum, whereas, in the system shown in Fig. 1, the voltage only is manually controlled, the frequency automatically following the voltage impressed, as dictated by the value of the required predetermined ratio. Additional resistors 90 and 91 may be included in the secondary circuit of the frequency changer by opening switches 82 and 83 and, through the agency of these and the switches 84 and 85, which control a portion of the resistance 10, the frequency of the machine 5 is so varied, by appropriate increments or decrements, that the required ratio is automatically established before and while the connection between the frequency changer and the main motor primary is effected. The automatic control of the resistances 33 in the motor secondary 3 is not shown but it may be added, as indicated in Fig. 1.

In the system shown in Fig. 3, the danger caused by the existence of single-phase energization of the main motor primary at the start of low-frequency operation is either eliminated or reduced to a minimum by the impression, upon the frequency changer, of the lowest voltage possible at the beginning of low-frequency operation.

To obtain normally high speed in the main motor, the controller handle is moved to the right, whereby the drum 34 is so actuated that switches 51, 52 and 53 are closed, thereby connecting the primary member 2 directly to the source of energy, and, in this connection, it should be noted that no interlock is needed, since only one handle is used. Subsequently, the drum 34 is moved in successive steps to the right, whereby the switches 58 to 63 are closed and all of the resistance 33 is removed from the secondary circuit of the motor 1.

When it is desired to obtain an exceptionally low speed with the modified system shown in Fig. 3, the handle for the segment 36 is moved to the left, a circuit first being completed whereby the switches 77, 78 and 79 are closed and the lowest possible voltage is impressed upon the frequency changer 5, thereby starting it. Further movement of the segment 36 to the left closes switches 54, 55 and 56 which establish a connection between the commutator end of the frequency changer and the main motor primary member. Increasingly high voltage is then impressed upon the frequency-changer slip rings by further movement of the segment 36 to the left. After the highest voltage is impressed upon the frequency changer the secondary resistance of the main motor is successively decreased, whereby the speed of the main motor is lowered until the "a" position of the segment is reached. It will be understood, in the above discussion, of course, that a decrease of secondary resistance results in a lowering of the speed during regenerative operation. Further movement of the segment 36 to the left lowers the voltage impressed upon the frequency changer, through the closing of the switches 74, 75 and 76 and the opening of the switches 68, 69 and 70. Subsequently, the frequency of the frequency changer is adjusted by closing the switches 88 and 89. Before doing this, however, the switches 61, 62 and 63 are opened, to again introduce a portion of the secondary resistance, this resistance then being taken out in steps before the next low-speed position "b" is reached. In going from position "b" to position "c", an analogous procedure is followed, the segment 36 being moved farther and farther to the left.

Throughout the above operation of the segment 36, the ratio of the voltage to the frequency is controlled by the relays 80 and 81. If the ratio is too high the relay switch 80 is lifted, whereby the switches 82 and 83 are opened and auxiliary resistors 90 and 91 are introduced into the secondary circuit of the frequency changer, thus increasing the secondary frequency and lowering the ratio to the required value. If, on the other hand, the ratio is too low, the limit switch 81 drops, thereby closing switches 84 and 85 and cutting out the portions of the resistor 10 which they govern. By this last operation, the secondary frequency of the frequency changer is decreased, and the ratio is consequently increased to the required value.

To prevent the motor from speeding up again when the main handle is moved to zero, after a period of low-speed operation, an additional auxiliary segment 36a is associated with the segment 36 and, in addition, interlocks (86 in), (87 in), (88 in) and (89 in) are provided. The auxiliary segment 36a is arranged to bridge auxiliary contacts 92 and 93 at approximately the same time that the first of the switches 86 to 89 is closed and to remain in contact with contacts 92 and 93 for substantially the entire period of low-speed operation. After the switches 86 to 89, inclusive, have once been closed, they are held in that position by the interlocks (86 in) to (89 in), inclusive, and thereby insure that, once the frequency is lowered, it will remain low while segment 36 is in the "a", "b" and "c" positions and until all the secondary resistance of the motor is in the circuit.

While I have described but two embodiments of my invention, it is obvious that many modifications may occur to those skilled in the art, and I desire, therefore, that only such limitations shall be placed thereon as are imposed by the prior art or as are specifically set forth in the appended claims.

I claim as my invention:

1. In combination with an induction motor, a regulating machine therefor, means connecting said machines, and automatic means for maintaining a predetermined ratio between the voltage and the frequency of said regulating machine and for preventing the operation of said connecting means unless said predetermined ratio does exist.

2. In combination with an induction motor comprising primary and secondary members, a regulating machine, automatic means adapted to connect said regulating machine to said primary member, and means whereby said connecting means are responsive to a predetermined ratio of voltage to frequency to prevent the connection of said machine unless said ratio exists.

3. In combination with an induction motor comprising primary and secondary members, a regulating machine, switching means adapted to connect said regulating machine to said primary member, interlocking means for preventing said switching means from operating simultaneously, and means responsive to a predetermined ratio of voltage to frequency for precluding the operation of two of said switching means until the establishment of the proper ratio.

4. In combination with an induction motor, comprising primary and secondary members, a regulating machine, switching means for connecting said regulating machine to said primary member, relay means responsive to a predetermined ratio of voltage to frequency for precluding the operation of said switching means until the establishment of said predetermined ratio, and means associated with said regulating machine whereby its frequency is varied until said ratio is established.

5. In combination with an induction motor, comprising primary and secondary members, a regulating machine, switching means for connecting said regulating machine to said primary member, relay means responsive to a predetermined ratio of voltage to frequency for precluding the operation of said switching means until the establishment of said predetermined ratio, and means associated with said regulating machine and controlled by said relay means whereby its frequency is varied until said ratio is established.

6. In combination with an induction motor, comprising primary and secondary members, a regulating machine, switching means for connecting said regulating machine to said primary member, means for varying the voltage impressed upon said regulating machine, and means responsive to a predetermined ratio of the voltage impressed on said regulating machine to the frequency developed therein for so regulating said frequency that said predetermined ratio is automatically established.

7. In combination with an induction motor, a regulating machine adapted for connection in the primary member thereof, a controller for the normal high-speed operation of said motor, a controller for the low-speed operation and having a plurality of low-speed running positions thereon, and means whereby, when said controller is moved in a reverse direction from that used in lowering the speed in order to stop said motor, the tendency for the motor to speed up is obviated.

8. In combination with an induction motor, a regulating machine adapted for connection in the primary member thereof, a controller for the normal high-speed operation of said motor, a controller for the low-speed operation and having a plurality of low-speed running positions thereon, and means, comprising an auxiliary contact segment on said low-speed controller and associated terminal members, whereby, when said controller is moved in a reverse direction from that used in lowering the speed in order to stop said motor, the tendency for the motor to speed up is obviated.

9. In a system of control, the combination with a consumption device requiring varying values of voltage and frequency, control means for permitting the manual adjustment of both voltage and frequency by a single operation, and additional automatic means for regulating either of said qualities to maintain a predetermined ratio therebetween.

10. The method of operating an induction motor at a normally high speed and at an exceptionally low speed without rheostatic losses and in conjunction with a frequency changer which consists in initially connecting the primary member of said motor to a source of energy for high-speed operation, and thereafter connecting said motor to said source through said frequency changer for low-speed operation, said last named low-speed connection being made in such manner that no currents having a frequency intermediate that used in high-speed operation and that used in low-speed operation are permitted to flow from said frequency changer.

11. The method of operating an induction motor at a normally high speed and at an exceptionally low speed without rheostatic losses and in conjunction with a frequency changer which consists in initially connecting the primary member of said motor to a source of energy for high-speed operation, and thereafter connecting said motor to said source, through said frequency changer, for low-speed operation, the transition from said high-speed connection to said low-speed connection being made at a predetermined ratio of voltage to frequency.

12. The method of operating an induction motor at a normally high speed and at an exceptionally low-speed without rheostatic losses and in conjunction with a frequency changer which consists in initially connecting the primary member of said motor to a source of energy for high-speed operation and thereafter connecting said motor to said source through said frequency changer for low-speed operation and running said frequency changer at the appropriate speed to furnish the required low frequency to said motor primary immediately upon connection thereto.

13. The method of accelerating and retarding an induction motor in conjunction with a frequency changer, which consists in initially connecting the primary member of said motor to a source of energy and the secondary member to a translating device, subsequently gradually eliminating said translating device, reintroducing it, connecting the primary of the motor to said source through said frequency changer, and again eliminating said translating device gradually.

14. The method of connecting a polyphase induction motor to a supply circuit in conjunction with an impedance device, which consists in closing two leads through said impedance, then closing the third lead, and finally eliminating said impedance device.

In testimony whereof, I have hereunto subscribed my name this 1st day of March, 1919.

RUDOLF E. HELLMUND.